(12) United States Patent
Nakashima et al.

(10) Patent No.: US 7,723,949 B2
(45) Date of Patent: May 25, 2010

(54) BATTERY DEVICE (75) Inventors: Ryoichi Nakashima, Tokyo (JP);
Hideyuki Sato, Chiba (JP); Yukio Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 402 days.

(21) Appl. No.: 11/526,738

(22) Filed: Sep. 26, 2006

(65) Prior Publication Data
US 2007/0080661 A1  Apr. 12, 2007

(30) Foreign Application Priority Data
Oct. 12, 2005  (JP)  ............................. 2005-297543

(51) Int. Cl.
*G01R 23/10* (2006.01)
*H02J 7/00* (2006.01)

(52) U.S. Cl. .......................... 320/107; 320/106; 702/78

(58) Field of Classification Search ................. 320/106, 320/107, 110, 112, 113, 114, 120, 121, 128, 320/132, 134, 135; 429/97, 98, 99, 100; 439/500; 173/27; 702/63, 64, 78
See application file for complete search history.

(56) References Cited

U.S. PATENT DOCUMENTS

| | | | |
|---|---|---|---|
| 5,642,032 A | 6/1997 | Kokuga | |
| 5,903,131 A * | 5/1999 | Sekine et al. ............... | 320/106 |
| 5,945,805 A | 8/1999 | Takei et al. | |
| 6,060,862 A * | 5/2000 | Sase et al. .................... | 320/132 |
| 6,242,890 B1 * | 6/2001 | Sudo et al. .................. | 320/128 |
| 6,664,000 B1 | 12/2003 | Sonobe | |
| 2003/0085685 A1 * | 5/2003 | Usui et al. ................... | 320/112 |
| 2004/0196004 A1 | 10/2004 | Sasaki | |
| 2005/0035738 A1 * | 2/2005 | Patino et al. ................ | 320/106 |
| 2005/0127877 A1 * | 6/2005 | Tsuchiya et al. ............ | 320/132 |

FOREIGN PATENT DOCUMENTS

| | | |
|---|---|---|
| JP | 10-084638 | 3/1998 |
| JP | 2002-14148 | 1/2002 |
| JP | 2002-017050 | 1/2002 |
| JP | 2003-168490 | 6/2003 |
| JP | 2005-135854 | 5/2005 |

OTHER PUBLICATIONS

U.S. Appl. No. 11/672,764, filed Feb. 8, 2007, Nakashima, et al.

* cited by examiner

*Primary Examiner*—Edward Tso
*Assistant Examiner*—M'Baye Diao
(74) *Attorney, Agent, or Firm*—Oblon, Spivak, McClelland, Maier & Neustadt, L.L.P.

(57) ABSTRACT

A battery device includes a battery cell including a cell terminal, a case that houses the battery cell, a battery terminal provided to the case and electrically connected to the cell terminal, and a control section that is housed in the case and allows and inhibits charge and discharge of the battery cell, wherein the control section includes a detection section that detects an output voltage value of the cell terminal at an interval, and assuming that the latest output voltage value detected by the detection section is V1, and the output voltage value detected by the detection section immediately before the latest output voltage value V1 is V0, the control section allows charge and discharge of the battery cell if $|\Delta V|$ ($\Delta V=V1-V0$) is smaller than a reference value, and to inhibit charge and discharge of the battery cell if $|\Delta V|$ is equal to and greater than the reference value.

13 Claims, 6 Drawing Sheets

BATTERY DEVICE

CROSS REFERENCES TO RELATED APPLICATIONS

The present invention contains subject matter related to Japanese Patent Application JP 2005-297543 filed in the Japan Patent Office on Oct. 12, 2005, the entire contents of which being incorporated herein by reference.

BACKGROUND OF THE INVENTION

1. Technical Field

The present invention relates to a battery device.

2. Related Art

Portable electronic equipment such as a mobile phone or a digital still camera uses a battery device (a battery pack) as a power source.

There is provided a battery device including a case, a battery cell housed in the case and provided with a cell terminal, a battery terminal provided to the case and electrically connected to the cell terminal, and a control section housed in the case and enabling or disabling the battery cell to perform charging or discharging operation (see, for example, Japanese Patent No. 3371146).

The control section has a function of preventing overcharge or over discharge of the battery cell to protect the battery cell. Therefore, the control section is designed in accordance with the electrical characteristic (specification) of each battery cell.

SUMMARY

Incidentally, it is concerned that a used battery devices are disassembled to take out the battery cells and the control sections, and a so-called rebuilt battery device is manufactured by gathering them in to be distributed.

Such a rebuilt battery device has not only a disadvantage of having a shorter life than the normal battery device since the battery cell has already been deteriorated, but also a threat that the overcharge and the over discharge are not properly protected since the control section not suitable to the battery cell is combined. Therefore, if the rebuilt battery device is implemented in electronic equipment, the desired performance is not exerted, and malfunction of the electronic equipment might be caused, thus the convenience for the user is disturbed.

In view of the above circumstances, it is desirable to provide an advantageous battery device capable of preventing manufacture and distribution of a rebuilt battery device by substantially disabling the function of the rebuilt battery device even if the battery device is rebuilt, thereby enhancing convenience for the user.

According to an embodiment of the invention, there is provided a battery device including a battery cell including a cell terminal, a case that houses the battery cell, a battery terminal provided to the case and electrically connected to the cell terminal, and a control section that is housed in the case and allows and inhibits charge and discharge of the battery cell, wherein the control section includes a detection section that detects an output voltage value of the cell terminal at a predetermined interval, and assuming that the latest output voltage value detected by the detection section is V1, and the output voltage value detected by the detection section immediately before the latest output voltage value V1 is V0, the control section is configured to allow charge and discharge of the battery cell in accordance with an absolute value $|\Delta V|$ of a difference $\Delta V = V1 - V0$ between the latest output voltage V1 and the previous output voltage V0 being smaller than a predetermined reference value, and to inhibit charge and discharge of the battery cell in accordance with the absolute value $|\Delta V|$ being equal to or greater than the predetermined reference value.

Further, according to another embodiment of the invention, there is provided a battery device including a battery cell including a cell terminal, a case that houses the battery cell, a battery terminal provided to the case and electrically connected to the cell terminal, and a control section that is housed in the case and allows and inhibits charge and discharge of the battery cell, wherein the control section includes a charge/discharge number counter section that counts the number of times of charge and discharge of the battery cell, and the control section is configured to allow charge and discharge of the battery cell in accordance with the number of times of charge and discharge counted by the charge/discharge number counter section being smaller than a predetermined reference value, and to inhibit charge and discharge of the battery cell in accordance with the number of times of charge and discharge counted by the charge/discharge number counter section being equal to or greater than the predetermined reference value.

Further, according to still another embodiment of the invention, there is provided a battery device including a battery cell including a cell terminal, a case that houses the battery cell, a battery terminal provided to the case and electrically connected to the cell terminal, and a control section that is housed in the case and allows and inhibits charge and discharge of the battery cell, wherein the control section includes a detection section that detects an output voltage value of the cell terminal at a predetermined interval, and the control section includes a charge/discharge number counter section that counts the number of times of charge and discharge of the battery cell, and assuming that the latest output voltage value detected by the detection section is V1, and the output voltage value detected by the detection section immediately before the latest output voltage value V1 is V0, the control section is configured to allow charge and discharge of the battery cell in accordance with an absolute value $|\Delta V|$ of a difference $\Delta V = V1 - V0$ between the latest output voltage V1 and the previous output voltage V0 being smaller than a first predetermined reference value and the number of times of charge and discharge counted by the charge/discharge number counter section being smaller than a second predetermined reference value, and to inhibit charge and discharge of the battery cell in accordance with one of the absolute value $|\Delta V|$ being equal to or greater than the first predetermined reference value, and the number of times of charge and discharge counted by the charge/discharge number counter section being equal to or greater than the second predetermined reference value.

According to an embodiment of the invention, even if the battery device is rebuilt, it becomes possible to substantially disable the rebuilt battery device. Therefore, manufacture and distribution of the rebuilt battery can be prevented, thus the convenience for the user can advantageously be enhanced.

DESCRIPTION OF THE EMBODIMENTS

First Embodiment

Embodiments of the invention will now be explained with reference to the accompanying drawings.

Figure 1:
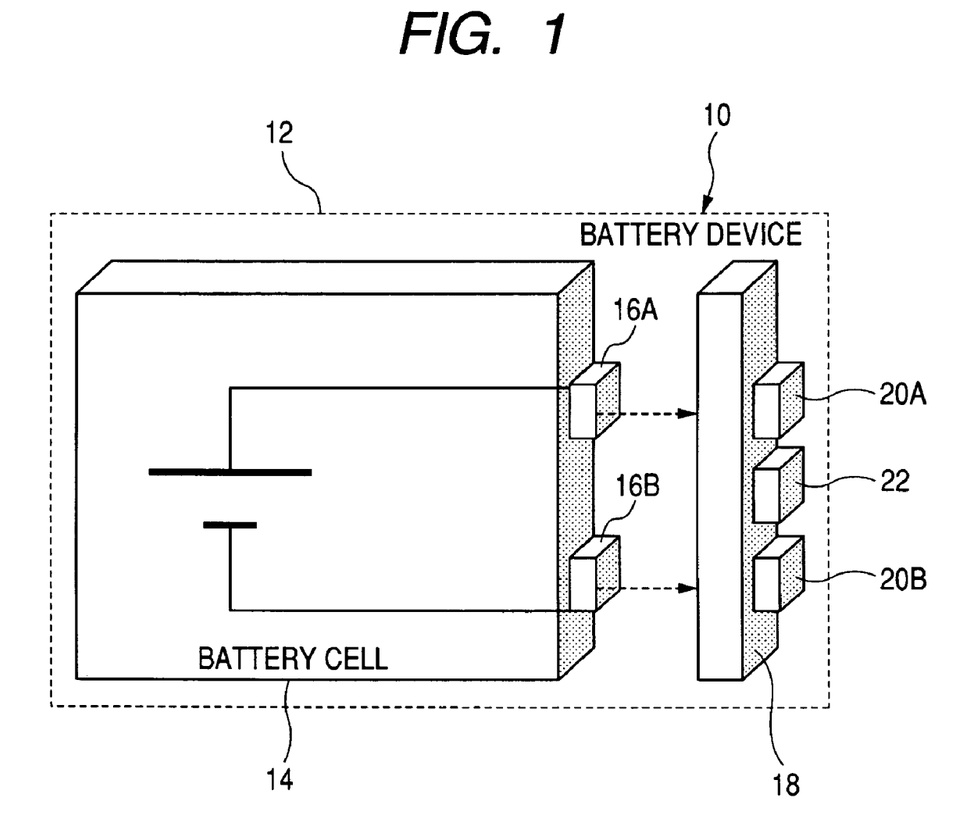
FIG. 1 is an explanatory diagram showing a configuration of a battery device 10.
Figure 2:
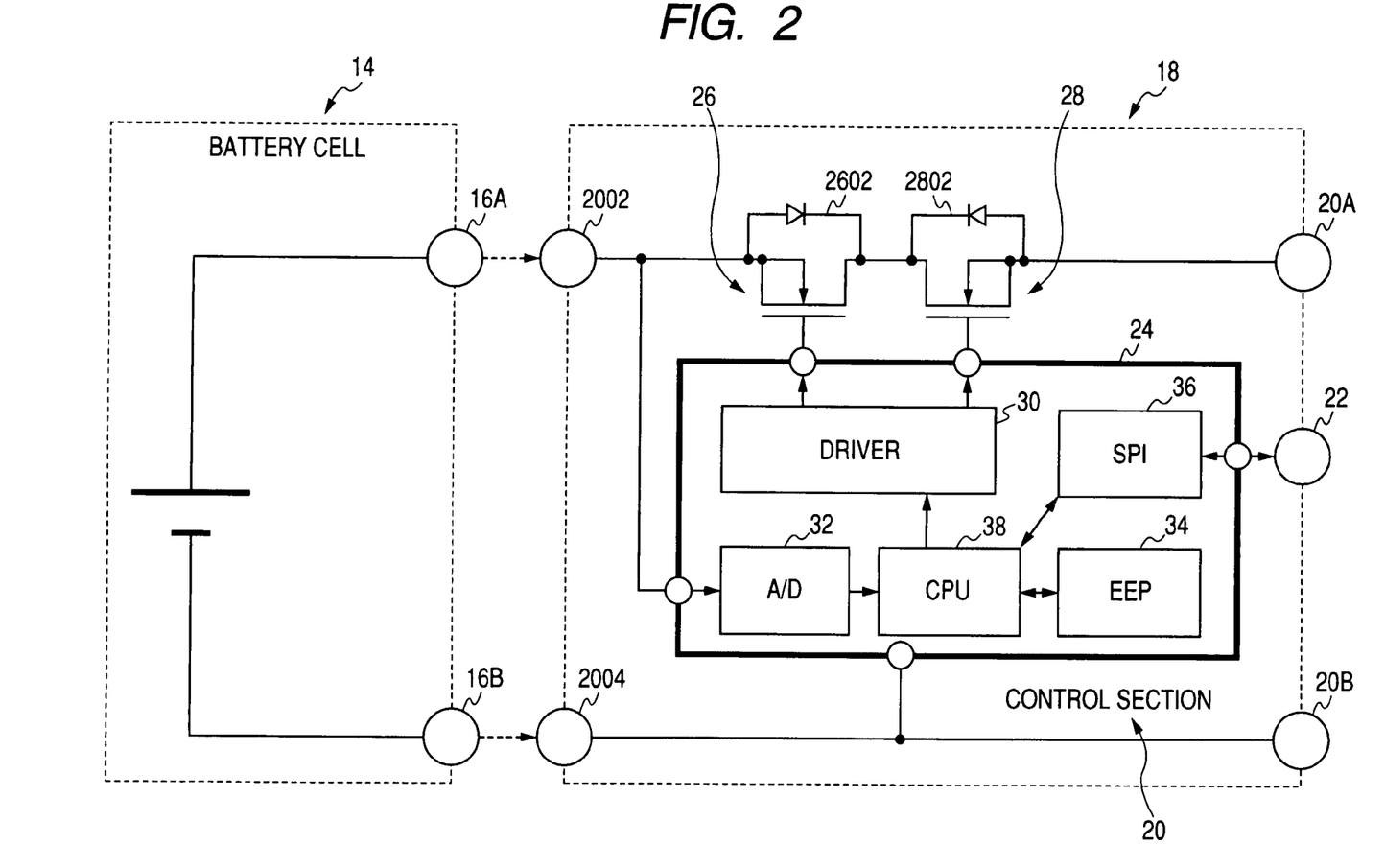
FIG. 2 is a block diagram of the battery device 10.

FIG. 1 is the explanatory diagram showing the configuration of the battery device 10, and FIG. 2 is the block diagram of the battery device 10, respectively.

As shown in FIGS. 1 and 2, the battery device 10 includes a case 12, which houses a battery cell 14 and a control board 18.

The battery cell 14 is composed of a secondary battery, specifically a rectangular plate shaped lithium-ion battery in the present embodiment. It should be noted that any secondary batteries such as a nickel-cadmium battery or a nickel-metal hydride battery can be adopted as the secondary battery here.

On one side of the battery cell, there are provided a positive cell terminal 16A and a negative cell terminal 16B.

The control board 18 has a band-plate shape and is held in the case 12 in the form in which the back face thereof overlaps one side of the battery cell.

The back face of the control board 18 is electrically connected to the cell terminals 16A and 16B.

The front face of the control board 18 is provided with a positive battery terminal 20A, a negative battery terminal 20B, and a control terminal 22 in the longitudinal direction with intervals, and the battery terminals 20A and 20B, and the control terminal 22 are exposed to the outside through openings provided to one side face of the case 12.

The control board 18 is provided with a plurality of electronic components mounted thereon to configure a control section 20.

As shown in FIG. 2, the control section 20 is provided with a microcomputer 24, the charging FET 26, and the discharging FET 28 to prevent overcharge and over discharge of the battery cell 14 thereby realizing a function of protecting the battery cell, and is designed in accordance with the electrical characteristic (specification) of each battery cell 14.

The positive cell terminal 16A of the battery cell 14 is electrically connected to the positive battery terminal 20A via a terminal 2002 and the charging FET 26 and the discharging FET 28 connected in series, and is also connected to the microcomputer 24.

The negative cell terminal 16B of the battery cell 14 is electrically connected to the negative battery terminal 20B via a terminal 2004, and is further connected to the microcomputer 24.

In detailed explanation, the cell terminal 16A is connected to the source electrode of the charging FET 26 via the terminal 2002 of the control section 20. The drain electrode of the charging FET 26 is connected to the source electrode of the discharging FET 28. The drain electrode of the discharging FET 28 is connected to the battery terminal 20A.

There is formed a body diode (an additional diode) 2602 between the source electrode and the drain electrode of the charging FET 26, and there is also formed a body diode (an additional diode) 2802 between the source electrode and the drain electrode of the discharging FET 28.

The gate electrode of the charging FET 26 and the gate electrode of the discharging FET 28 are provided with drive signals supplied from a driver 30 of the control section 20 described later, thereby controlling on/off actions of the charging FET 26 and the discharging FET 28.

In the present embodiment, the a switch section for switching on/off the electrical connection between the battery cell 14 and the battery terminals 20A and 20B is composed of the charging FET 26 and the discharging FET 28. It should be noted that it is sufficient for the switch section to have the function of switching on/off the electrical connection between the battery cell 14 and the battery terminals 20A, 20B, and the switch section is not limited to the FET.

The microcomputer 24 is configured including the driver 30, an A/D converter 32, a nonvolatile memory 34, a communication interface 36, a CPU 38, and so on.

The A/D converter 32 is connected to the positive cell terminal 16A via the terminal 2002 for detecting the output voltage of the battery cell 14 and supplying the CPU 38 with the output voltage as an output voltage value V after converting it form analog data to digital data.

Therefore, in the present embodiment, a detection section for detecting the output voltage value V between the cell terminals 16A, 16B in a predetermined time interval is configured with the A/D converter 32.

The nonvolatile memory 34 (e.g., EEPROM) is configured with, for example, a flash memory, and holds the stored contents even when the power supply is switched off.

Various kinds of information is stored in the nonvolatile memory 34 by the CPU 38.

The stored information includes the output voltage value V, genuine cell information D1 representing that the battery device 10 is a regular component, ID information (identification information) D2 uniquely assigned to the battery device 10, unused device information D3 representing that the battery device 10 is just manufactured and not yet used, deep discharge attainment information D4, and so on, wherein the genuine cell information D1, ID information (identification information) D2, and the unused device information D3 are previously stored as factory default setting.

The communication interface 36 is an interface used when the CPU 38 performs bi-directional communication with an external device via the control terminal 22, and is configured with a serial peripheral interface (SPI) known to the public from the past in the present embodiment.

Therefore, the communication section for performing communication with the external device is configured with the CPU 38 and the communication interface 36. It should be noted that it is sufficient for the communication section to be able to perform the communication with the external device, and accordingly, the communication section is not limited to the serial communication.

The CPU 38 operates by executing the program stored in a ROM (not shown), and controls the driver 30, the A/D converter 32, the nonvolatile memory 34, and the communication interface 36. The CPU performs the operation with the direct current power supplied via the cell terminals 16A, 16B of the battery cell 14.

Variation of the output voltage value V of the battery cell 14 and the on/off operation of the charging FET 26 and discharging FET 28 in the case in which the regular battery device 10, instead of the rebuilt battery device, is used will be explained.

Figure 3:
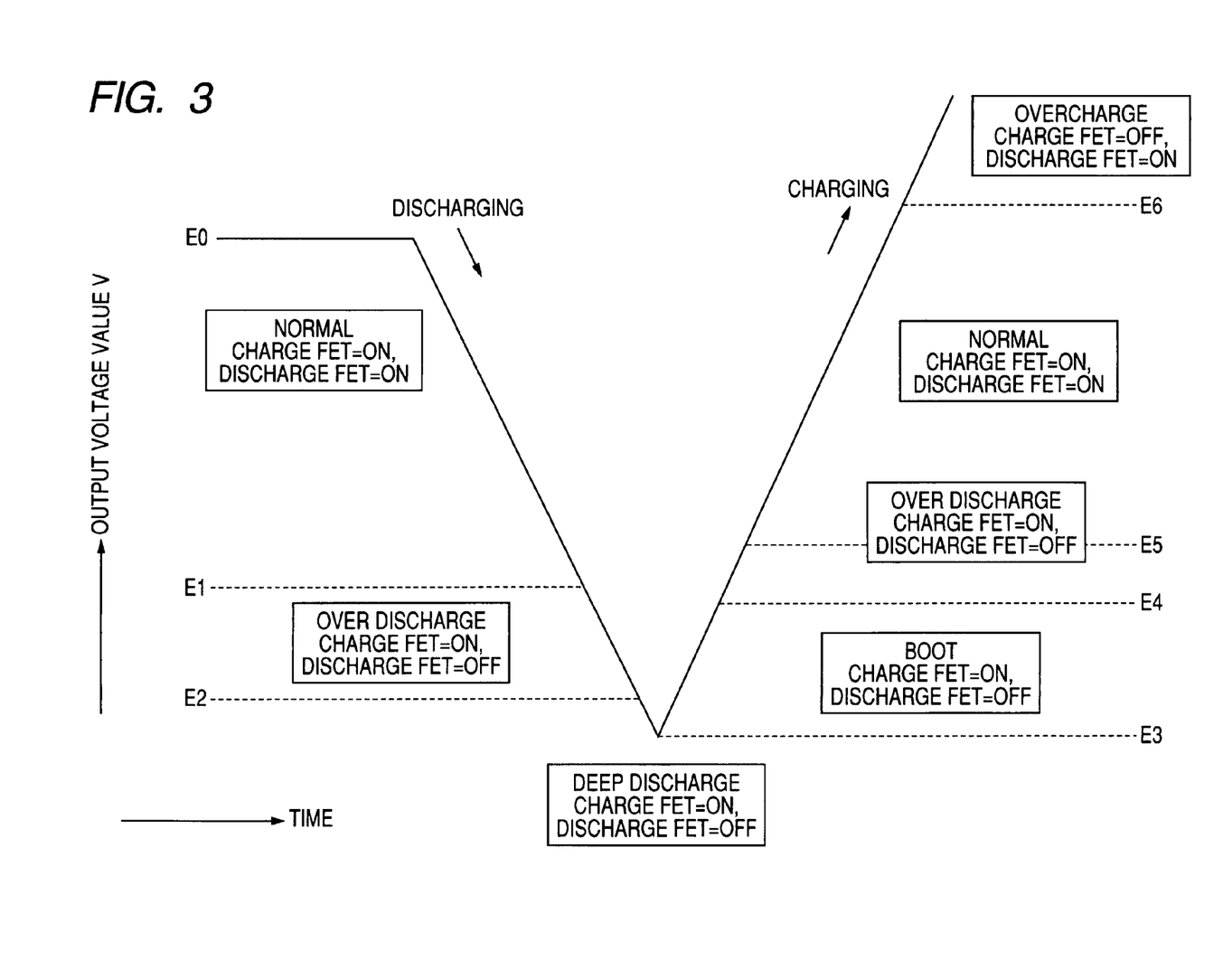
FIG. 3 is a chart for schematically explaining the operations of a battery cell 14, a charging FET 26, and a discharging FET 28.

FIG. 3 is a chart for schematically explaining the operations of the battery cell 14, the charging FET 26, and the discharging FET 28, wherein the horizontal axis denotes time, and the vertical axis denotes the output voltage value V of the cell 14.

Firstly, the operations when the battery device 10 is in the discharging state will be explained.

In a full charge state, the output voltage value V equals E0 (V=E0).

When the battery device 10 is implemented in electronic equipment in this state, the CPU 38 sends the genuine cell information D1 and the ID information D2 retrieved from the nonvolatile memory 34 to the electronic equipment in response to a request from the electronic equipment. If the electronic equipment confirms that the genuine cell information D1 and the ID information D2 are the valid ones, it sends information representing that the confirmation is successful back to the CPU 38.

Thus, the CPU 38 switches both the charging FET 26 and the discharging FET 28 to the on-state via the driver 30 to supply the electronic equipment with the voltage value of the battery cell 14 from the battery terminals 20A, 20B via both the charging FET 26 and the discharging FET 28.

It should be noted that the CPU 38 watches the output voltage value V of the battery cell 14 in a predetermined interval.

The output voltage value V gradually drops from the voltage value of E0 as the discharge of the battery cell 14 proceeds.

When the discharge further proceeds and the output voltage value V reaches the over discharge state (lower than the voltage value of E1), the CPU 38 switches off the discharging FET 28 while keeping the charging FET 26 in the on-state to stop further discharge.

Thus, the discharge from the battery device 10 to the outside is stopped while the power consumption (discharge) by the CPU 38 is continued.

Before long, when the output voltage value V reaches the deep discharge state with the output voltage value (e.g., 2.2 V) in which the CPU 38 cannot operate stably, the CPU 38 automatically shuts itself down after storing the deep discharge attainment information D4 representing that the deep discharge state has been reached in the nonvolatile memory 34.

Since the discharge of the battery cell 14 is continued by a minute leakage current even in the deep discharge state, if this state is continued for a long period of time, the output voltage value V of the battery cell 14 becomes zero (V=E3=0).

The operations when the battery device 10 is in the charging state will now be explained.

When the battery device 10 in the deep discharge state is implemented in charging equipment, charging is started via the battery terminals 20A, 20B.

In this case, although the discharging FET 28 is in the off-state, the body diode 2802 of the discharging FET 28 is in the forward direction with respect to the charging current, and therefore, the charging is performed via the body diode 2802 and the charging FET 26, which is in the on-state, with the small charging current.

When the output voltage V of the battery cell 14 rises to reach the voltage value range (between the voltage values E4 and E5) in which the CPU 38 can operate, the CPU 38 starts to switch both the charging FET 26 and the discharging FET 28 to the on-state, thereby forming the normal charging state. Thus, the charging is performed with the large charging current supplied via the charging FET 26 and the discharging FET 28 both in the on-state.

Before long, when the output voltage value V of the battery cell 14 reaches the full charge state (the voltage value of E0), the charging equipment automatically shuts itself down to terminate the charging operation.

Further, if the charging is continued exceeding the full charge state by some cause, the output voltage value V will reach the overcharge state (the voltage value of E6).

In the overcharge state, the CPU 38 switches off the charging FET 26 while maintaining the discharging FET 28 in the on-state in response to detection of the overcharge state for preventing the deterioration of the battery cell 14. Thus, the further charging operation is inhibited, and only discharging operation is allowed.

The operation of the battery device 10 will hereinafter be explained with reference to the flowchart shown in FIG. 4.

Firstly, when the CPU 38 is started, the CPU 38 retrieves the genuine cell information D1 stored in the nonvolatile memory 34, and judges whether or not the genuine cell information D1 is true and correct (step S10).

If the genuine cell information D1 is not true nor correct, the CPU 38 judges that the battery device 10 has been rebuilt, and switches both the charging FET 26 and the discharging FET 28 to the off-state (step S18). Thus, both the charging operation and the discharging operation by the battery device 10 are inhibited.

Subsequently, the communication via the control terminal 22 is inhibited (step S20). Thus, it is also inhibited that the battery device 10 is used while being implemented in the electronic equipment.

On the other hand, if it is judged in the step S10 that the genuine cell information D1 is true and correct, the CPU 38 detects the output voltage value V by the A/D converter 32 (step S12) to judge whether or not either one of the three conditions A, B, and C described later is satisfied (step S14).

The three conditions A, B, and C judged in the step S14 will be explained.

Assuming that the latest output voltage value is V1, and the output voltage value detected immediately before the latest output voltage value V1 is detected is V0, the condition A is that the absolute value $|\Delta V|$ of the difference $\Delta V$ between the output voltage values V1, V0 ($\Delta V=V1-V0$) is smaller than a predetermined reference value.

If the battery cell 14 has once been detached from the control section 20 for rebuilding and the output voltage value V has dramatically dropped, it becomes that the condition A is no longer satisfied.

The condition B is that the unused device information D3 is stored in the nonvolatile memory 34.

That is, the condition B is provided for compulsorily forwarding the process to the next step S16 in the case in which the CPU 38 is started first immediately after it is manufactured because the output voltage value V is not stored in the nonvolatile memory 34 in that case.

The condition C is that the deep discharge attainment information D4 is stored in the nonvolatile memory 34.

This condition is provided for compulsorily forwarding the process to the next step S16 in the case in which the deep discharge has been reached because the condition A is no longer satisfied in that case.

In the step S14, if either one of the three conditions A, B, and C is satisfied, it is judged that the battery device 10 has not been rebuilt, and the output voltage value stored in the nonvolatile memory 34 is overwritten with the latest output voltage value described above (step S16), and then the process returns to the step S12 to repeatedly perform the same process.

In this state, if the battery device 10 is implemented in the electronic equipment, the discharging process is performed normally.

It should be noted that the steps S12, S14, and S16 are repeated in a predetermined period of time (e.g., less than one second).

If in the step S14, neither of the three conditions A, B, and C is satisfied, the CPU 38 judges that the battery device 10 has been rebuilt, and deletes the genuine cell information D1 in the nonvolatile memory 34 (step S22). Thus, even if the CPU 38 of the battery device 10 is started again, it is judged in the step S10 that the genuine cell information D1 is not true nor correct, the use of the battery device 10 is inhibited, and the charging operation and the discharging operation are also inhibited.

Subsequently, both the charging FET 26 and the discharging FET 28 are switched off (step S24), and the communication via the control terminal 22 is inhibited (step S26). The communication is inhibited by, for example, fixing the serial data to zero or one. The use of the battery device 10 can be inhibited, and the charging operation and the discharging operation can be inhibited also by the steps S24, S26.

According to the battery device 10 of the present embodiment, since the charging and discharging of the battery cell 14 is inhibited in the case in which the variation in the output voltage V of the battery cell 14 is equal to or greater than a predetermined reference value, if the battery cell 14 is detached from the control section 20 of the battery device 10 and replaced with another battery cell 14 for rebuilding, the rebuilt battery device can substantially be prevented from functioning, thereby preventing manufacturing and distributing the rebuilt battery device to provide an advantage of enhancing convenience for the user.

Further, in the present embodiment, the hardware configuration of the control section 20 is the same as that in the related art, and the process of the CPU 38 is mainly different from each other. In other words, since it is sufficient to modify mainly the control program performed by the CPU 38, the increase in cost can advantageously be suppressed.

Further, even in the case in which the variation in the output voltage value V of the battery cell 14 exceeds the predetermined reference value because of short-circuit and so on of the battery device 10 caused by some other factors than the rebuilding, the charging and discharging of the battery cell 14 are inhibited, thus providing an advantage in protecting the battery device 10 and the electronic equipment implementing the battery device 10.

Still further, since in the present embodiment the nonvolatile memory 34 stores the latest one of the output voltage value V, the output voltage value V stored in the nonvolatile memory 34 can be retrieved via, for example, the control terminal 22. Therefore, it is advantageous that a malfunction analysis of the battery device 10 can efficiently be performed without disassembling the battery device 10.

Further, since in the present embodiment the control section 20 inhibits charge and discharge of the battery cell 14 by deleting the genuine cell information D1 in the nonvolatile memory 34, it can be inhibited to reuse the control board 18 implementing the control section 20, thus advantageously preventing the rebuilding of the battery device 10.

It should be noted that although the inhibition of the charge and discharge operations of the battery cell 14 by the control-section 20 is realized by the three operations, namely deleting the genuine cell information D1 to inhibit the operation of transmitting the genuine cell information D1, switching off the charging FET 26 and the discharging FET 28, and inhibiting the communication operation by the control section 20, it is obvious that the inhibition of the charge and discharge operations of the battery cell 14 by the control section 20 can be achieved by performing one or two of the three operations.

However, by performing all of the three operations as in the present embodiment, an advantage is obtained in surely inhibiting the operations of the rebuilt battery device.

Further, although in the present embodiment the inhibition of the charge and discharge operations of the battery cell 14 by the control section 20 is performed by deleting the genuine cell information D1 to inhibit the operation of transmitting the genuine cell information D1, the inhibition of the charge and discharge operations of the battery cell 14 by the control section 20 can also be performed by deleting the ID information D2 to inhibit the operation of transmitting the ID information D2.

Further, although in the present embodiment the case in which the inhibition of the charge and discharge operations of the battery cell 14 is performed by switching off both the charging FET 26 and the discharging FET 28 is explained, the charge and discharge operations of the battery cell 14 can also be inhibited by switching off either one of the charging FET 26 and the discharging FET 28. However, by switching off both the charging FET 26 and the discharging FET 28 as is the case with the present embodiment, both the charge and the discharge operations of the battery cell 14 are disabled, thus an advantage in more surely inhibiting the use of the rebuilt battery device can be obtained.

Second Embodiment

A second embodiment will now be described.

In the first embodiment, it is arranged to discriminate that the battery cell 14 is detached utilizing the fact that the output voltage value V detected by the A/D converter 32 is dramatically dropped when detaching the battery cell 14 from the control section 20.

However, it is possible that the output voltage value V is prevented from dramatically dropping by supplying the A/D converter 32 with a voltage from another power supply device when detaching the battery cell 14 from the control section 20.

Therefore, in the second embodiment, the number of times of the charge and discharge operations to the battery cell 14 is counted, and the charge and discharge operations of the battery cell 14 are inhibited when the number of times of the charge and discharge operations exceeds a predetermined amount, thus substantially preventing the rebuilt battery device 10 from functioning even if the avoidance measure described above is taken.

Figure 5:
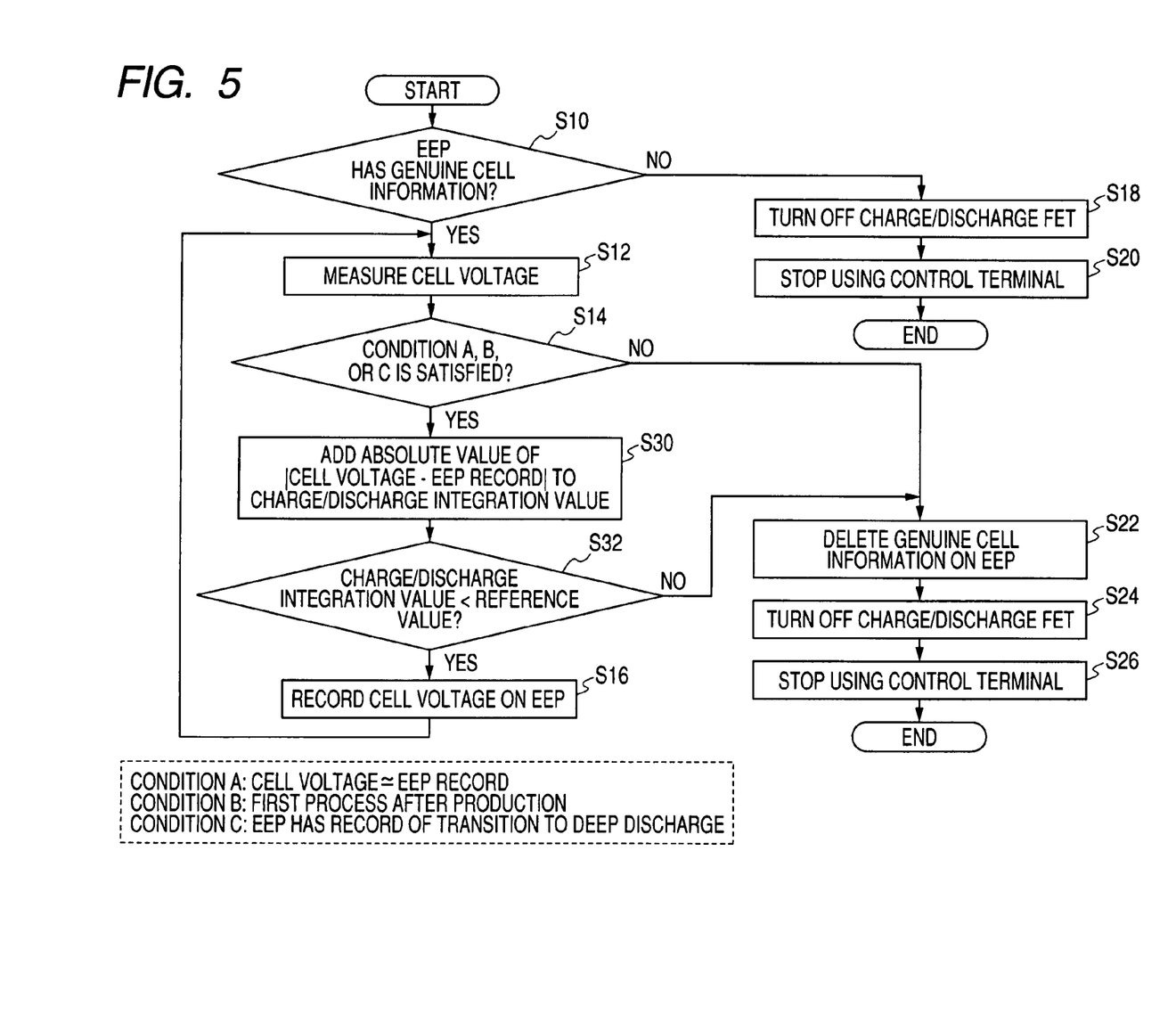
FIG. 5 is a flowchart of the battery device 10 according a second embodiment.

FIG. 5 is a flowchart of the battery device 10 according the second embodiment. It should be noted that in the present embodiment, the same or similar steps, sections, and members as those of the first embodiment will be denoted with the same reference numerals, and the descriptions therefor will be omitted.

Figure 4:
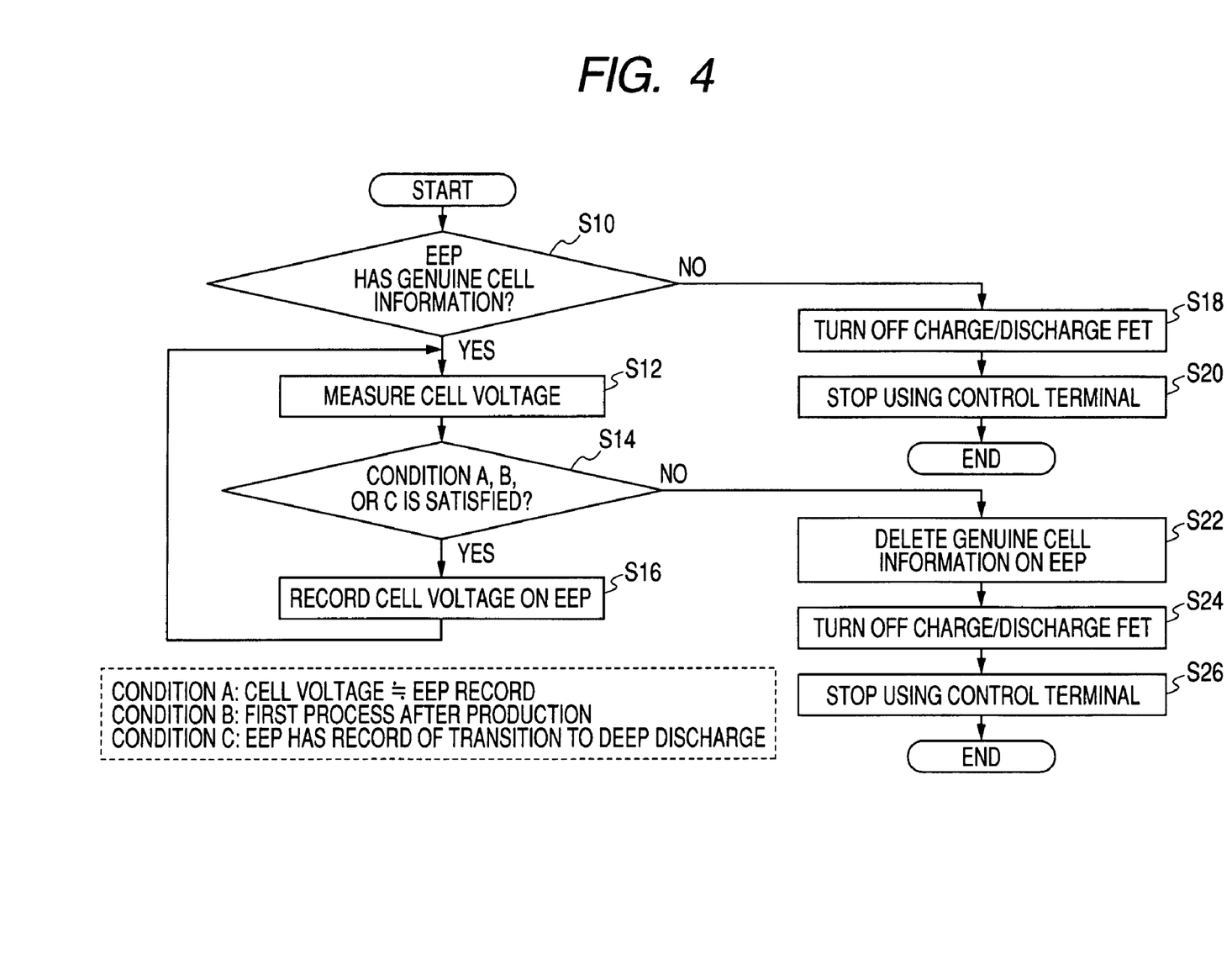
FIG. 4 is a flowchart of the battery device 10 according a first embodiment.

As shown in FIG. 5, the difference from the flowchart in FIG. 4 showing the first embodiment is that the steps S30, S32 are added.

That is, in the step S30, the total sum of the absolute value $|\Delta V|$ is held as a charge/discharge integration value $S\Delta V$ by adding the absolute value $|\Delta V|$ of the difference of the output voltage value obtained in the step S12 to the nonvolatile memory 34.

Subsequently, in the step S32, whether or not the charge/discharge integration value $S\Delta V$ is smaller than a predetermined reference value is judged, and if the charge/discharge integration value $S\Delta V$ is smaller than the predetermined reference value, the process proceeds to the step S16 to rewrite the output voltage value stored in the nonvolatile memory 34 with the latest output voltage value, and then the process goes back to the step S12 to repeatedly perform the same process.

In this state, if the battery device 10 is implemented in the electronic equipment, the discharging process is performed normally.

Further, if the charge/discharge integration value SΔV is equal to or greater than the predetermined reference value in the step S32, the process proceeds to the step S22.

That is, in the second embodiment, the charge/discharge integration value SΔV is used as the number of times of the charge and discharge operations, and the charge and discharge operations of the battery cell 14 are allowed if the charge/discharge integration value SΔV (the number of times of the charge and discharge operations) is smaller than the predetermined reference value, and if the charge/discharge integration value SΔV (the number of times of the charge and discharge operations) is equal to or greater than the predetermined reference value, the charge and discharge operations of the battery cell 14 are inhibited.

It should be noted that in the second embodiment, a charge/discharge number counter section mentioned in the appended claims is composed of the CPU 38 and the nonvolatile memory 34.

Since in the second embodiment, in addition to the advantages in the first embodiment, the charge and discharge operation of the battery cell 14 are inhibited when the predetermined number of times of the charge and discharge operations is exceeded, even if it is avoided that the output voltage value dramatically drops when detaching the battery cell 14 from the control section 20 by supplying the A/D converter 32 with a voltage from another power source device, the rebuilt battery device 10 can substantially be prevented from functioning, thus preventing the manufacture and the distribution of the rebuilt battery devices to advantageously enhance the convenience for the user.

Further, also in the second embodiment, the hardware configuration of the control section 20 is the same as that in the related art, and the process of the CPU 38 is mainly different from each other. In other words, since it is sufficient to modify mainly the control program performed by the CPU 38, the increase in cost can advantageously be suppressed.

It should be noted that although the total sum (the charge/discharge integration value SΔV) of the difference ΔV in the output voltage value of the battery cell 14 is used as the number of times of the charge and discharge operations in the second embodiment, a total sum (a charge/discharge integration value SΔI) of the difference ΔI in the output current value I from the battery cell 14 can also be used as the number of times of the charge and discharge operations.

Figure 6:
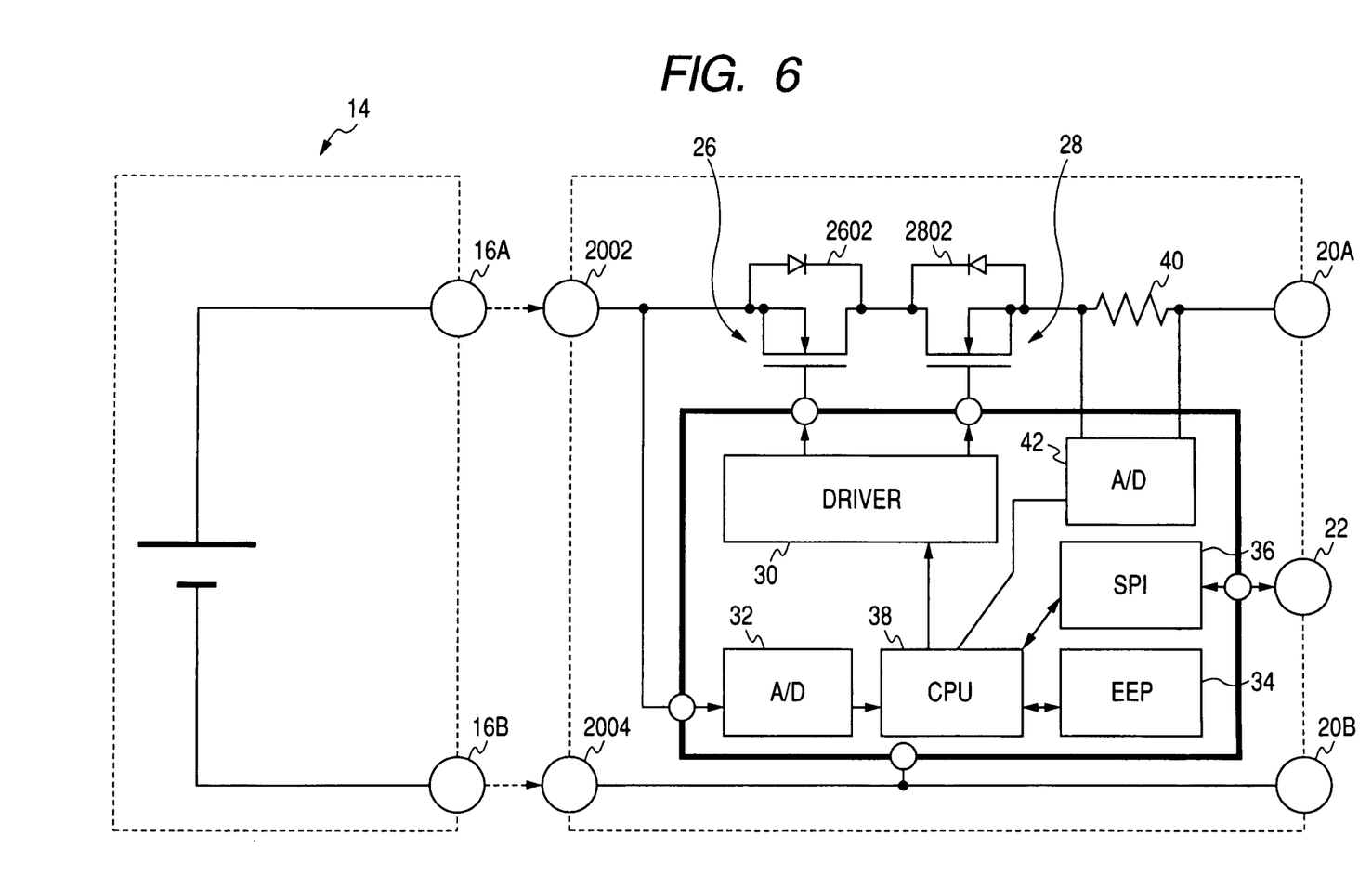
FIG. 6 is a block diagram of the battery device 10 in a modified example.

In this case, as shown in FIG. 6, it is sufficient to arrange that a resistor 40 of several tens of milliohms is connected in series between the battery terminal 20A and the discharging FET 28, the potential difference between both ends of the resistor 40 is measured by the A/D converter 42, the potential difference value E thus measured is supplied to the CPU 38, and the CPU 38 converts it into the output current value I.

That is, the detection section is composed of the resistor 40 and the A/D converter 42. Assuming the output current value detected by the detection section immediately before the latest output current value I1 as I0, the control section 20 calculates an absolute value |ΔI| of the difference ΔI between the latest output current value I1 and the previous output current value I0 (ΔI=I1−I0) every time the detection section detects the output current value, and calculates and holds the total sum of the obtained absolute value |ΔI| as the charge/discharge integration value SΔI.

It should be noted that it has been already performed in the battery device in the related art that the resistor 40 and the A/D converter 42 are provided to measure the output current value I, and the output current value I is transmitted to the electronic equipment.

Therefore, also in this case, since there is no need for newly providing the resistor 40 and the A/D converter 42 in order for obtaining the charge/discharge integration value SΔI, the hardware configuration in the related art can be used as that of the control section 20, and it is sufficient to mainly modifying the control program to be executed by the CPU 38, thus advantageously preventing increase in cost.

It should be noted that the charge/discharge integration value SΔV is calculated in both the charge and discharge operations in the second embodiment, and in the case with the discharge operation, the output voltage of the battery cell 14 might temporarily drop dramatically in accordance with the temporary increase in the power consumption, which increases the error in the charge/discharge integration value SΔV. In order for solving such a problem, it is possible to calculate the charge integration value SΔV mainly in the charge operation in which the voltage does not temporarily vary in a large width but varies stably.

Further, although the case in which the voltage or the current is used as the charge/discharge integration value is explained in the second embodiment, the electrical power, which is the product of the voltage and the current, can also be calculated as the charge/discharge integration value.

Further, it is also possible that a timer section (e.g., a counter for counting a clock signal) for measuring time is provided to the battery device 10, the hours of service of the battery device 10 from start of the use is measured by the timer section, and the charge and discharge operations of the battery cell 14 is inhibited by the control section 20 as is the case with the first and the second embodiments, when the hours of service exceeds a predetermined reference value (absolute usable period).

Alternatively, it is also possible that it is arranged to send time information (date and time) from the electronic equipment implementing the battery device 10 to the control section 20 of the battery device 10 instead of providing the timer section to the battery device 10, the control section 20 calculates the hours of service from the start of the use based on the time information sent therefrom, and the charge and discharge operations of the battery cell 14 is inhibited by the control section 20 as is the case with the first and the second embodiments, when the hours of service exceeds a predetermined reference value (absolute usable period).

Further, the same configuration as described above can be adopted to the electronic equipment, and it can be configured to inhibit the operation of the electronic equipment by a control section of the electronic equipment when the hours of service exceeds the absolute usable period.

It should be understood by those skilled in the art that various modifications, combinations, sub-combinations and alterations might occur depending on design requirements and other factors insofar as they are within the scope of the appended claims or the equivalents thereof.

What is claimed is:

1. A battery device comprising:
a battery cell including a cell terminal;
a case that houses the battery cell;
a battery terminal provided to the case and electrically connected to the cell terminal; and
a control section that is housed in the case and allows and inhibits charge and discharge of the battery cell,
the control section including, a detection section that detects an output voltage value of the cell terminal at a predetermined interval and is operative to allow charge and discharge of the battery cell in accordance with an absolute value |ΔV| corresponding to a difference ΔV=V1−V0 between a latest output voltage V1 and a previous output voltage V0 if ΔV is smaller than a predetermined reference value, and inhibits charge and discharge of the battery cell when the absolute value |ΔV| is equal to or greater than the predetermined reference value.

2. A battery device comprising:
a battery cell including a cell terminal;
a case that houses the battery cell;
a battery terminal provided to the case and electrically connected to the cell terminal; and
a control section that is housed in the case and allows and inhibits charge and discharge of the battery cell, and
the control section including,
a charge/discharge number counter section that counts the number of times of charge and discharge of the battery cell, and
wherein the control section is configured to allow charge and discharge of the battery cell in accordance with the number of times of charge and discharge counted by the charge/discharge number counter section being smaller than a predetermined reference value, and to inhibit charge and discharge of the battery cell in accordance with the number of times of charge and discharge counted by the charge/discharge number counter section being equal to or greater than the predetermined reference value.

3. A battery device comprising:
a battery cell including a cell terminal;
a case that houses the battery cell;
a battery terminal provided to the case and electrically connected to the cell terminal; and
a control section that is housed in the case and allows and inhibits charge and discharge of the battery cell,
the control section including,
a detection section that detects an output voltage value of the cell terminal at a predetermined interval, and
a charge/discharge number counter section that counts the number of times of charge and discharge of the battery cell, and
wherein the control section is configured to allow charge and discharge of the battery cell in accordance with an absolute value |ΔV| corresponding to a difference ΔV=V1−V0 between a latest output voltage V1 and previous output voltage V0 if ΔV is smaller than a first predetermined reference value and the number of times of charge and discharge counted by the charge/discharge number counter section is smaller than a second predetermined reference value, and inhibits charge and discharge of the battery cell when one of the absolute value |ΔV| is equal to or greater than the first predetermined reference value, and the number of times of charge and discharge counted by the charge/discharge number counter section is equal to or greater than the second predetermined reference value.

4. The battery device according to any one of claims 1 through 3, further comprising
a switch section that is housed in the case and switches on and off an electrical connection between the battery cell and the battery terminal,
wherein the control section inhibits charge and discharge of the battery cell by switching off the switch section.

5. The battery device according to any one of claims 1 through 3, further comprising
a control terminal provided to the case,
wherein the control section includes a communication section that communicates with an external device via the control terminal, and the control section inhibits charge and discharge of the battery cell by inhibiting a communication operation of the communication section.

6. The battery device according to any one of claims 1 through 3, further comprising
a control terminal provided to the case,
wherein the control section includes a communication section that communicates with an external device via the control terminal, and the control section inhibits charge and discharge of the battery cell by inhibiting transmission of information representing that the battery device is a regular component from the communication section to the external device.

7. The battery device according to one of claims 1 and 3,
wherein the control section is provided with a nonvolatile memory, the control section is configured to store the output voltage value detected by the detection section in the nonvolatile memory, and the output voltage value detected by the detection section immediately before the latest output voltage value V1 is a value retrieved from the nonvolatile memory.

8. The battery device according to claim 2,
wherein the control section includes
a detection section that detects an output voltage value of the cell terminal at a predetermined interval, and is configured to calculate an absolute value |ΔV| of a difference ΔV=V1−V0 between a latest output voltage value V1 and a previous output voltage value V0, and to calculate and hold a total sum of the obtained absolute value |ΔV| as a charge/discharge integration value SΔV every time the detection section detects the output voltage value, and uses the charge/discharge integration value SΔV as the number of times of charge and discharge.

9. The battery device according to claim 8,
wherein the control section is provided with a nonvolatile memory, the control section is configured to store the output voltage value detected by the detection section in the nonvolatile memory, and the output voltage value detected by the detection section immediately before the latest output voltage value V1 is a value retrieved from the nonvolatile memory.

10. The battery device according to claim 6,
wherein the control section is provided with a nonvolatile memory, the information representing that the battery device is a regular component is stored in the nonvolatile memory, and the transmission of the information representing that the battery device is a regular component is inhibited by deleting the information representing that the battery device is a regular component stored in the nonvolatile memory.

11. The battery device according to claim 6,
wherein the information representing that the battery device is a regular component is one of ID information uniquely assigned to the battery device and genuine battery cell information composed separately from the ID information.

12. The battery device according to claim 1, wherein the battery cell is mainly composed of one of a lithium-ion battery, a nickel-cadmium battery, and a nickel-metal hydride battery.

13. The battery device according to one of claims 2 and 3, wherein the battery terminal is mainly composed of two terminals, a positive terminal and a negative terminal, and the control terminal is mainly composed of a terminal that communicates serial data.

* * * * *